Nov. 12, 1929. W. H. ALLEN Re. 17,484
RUSTPROOFING PROCESS
Original Filed May 7, 1926
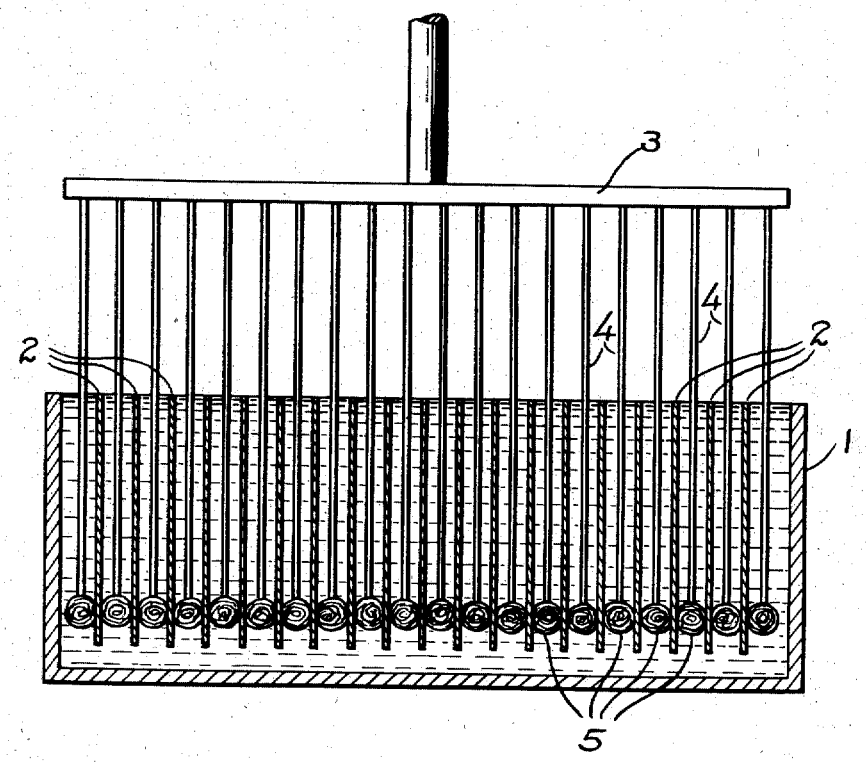
INVENTOR.
William H. Allen
BY
Francis O. Hardesty
ATTORNEY.

Reissued Nov. 12, 1929

Re. 17,484

UNITED STATES PATENT OFFICE

WILLIAM H. ALLEN, OF DETROIT, MICHIGAN, ASSIGNOR, BY MESNE ASSIGNMENTS, TO PARKER RUST PROOF COMPANY, OF DETROIT, MICHIGAN, A CORPORATION OF MICHIGAN

RUSTPROOFING PROCESS

Original No. 1,654,716, dated January 3, 1928, Serial No. 107,384, filed May 7, 1926. Application for reissue filed November 9, 1928. Serial No. 318,289.

The present invention relates to the treatment of ferrous metals to protect them against rusting and relates specifically to improvements in rust proofing processes such as set out in the patent to Coslett 870,937 of Nov. 12, 1907.

In the practice of the Coslett process iron or steel articles are placed in a boiling bath containing water, phosphoric acid and iron filings and allowed to remain for a time. The articles in this treatment acquire a coating of phosphate of iron which adheres firmly and affords protection of the article against the oxidizing action of air and moisture.

In carrying out the outlined process on articles which are subsequently to be enameled, it has been found that such articles, especially metal sheets, frequently have their surfaces so roughened by the coating that, when enameled, they do not present the desirable smooth polished surface.

It is among the objects of the present invention therefore to prevent this rough deposit and produce rust proofed articles which are quite smooth on their surfaces and which, when subsequently enameled shall present the characteristic smooth polished surface.

Another object is means by which such operation may be accomplished.

With these and other objects in view as will readily appear to those skilled in the art the invention consists in causing inert bodies of suitable nature to contact with the surfaces of the article being treated so as to agitate the comparatively quiescent layer of solution at this location thereby allowing better action of the solution and also preventing crystal growth.

Referring to the drawing, the figure is a more or less diagrammatic representation, one form of an apparatus by means of which the operation is carried out.

In the drawing, 1 indicates a tank or vat in which the solution of water phosphoric acid and iron filings is first boiled. Indicated at 2 are metal sheets to be coated with the phosphate. These may be placed in suitable racks or cages (not shown) and are preferably evenly spaced as indicated.

Above the tank 1 and adapted to be raised and lowered is a frame 3 carrying a series of rods 4 carrying at their lower ends pads or rolls 5 of material unaffected by the solution. These pads 5 will be long enough to extend the full width of the sheets 2 and large enough to rub lightly the adjacent surfaces of two sheets.

These pads or rolls are preferably of cotton cloth or covered with this material but it is obvious other materials may be used. It is also obvious that other means than the specific apparatus shown may be used for the operation which consists in slowly and lightly rubbing the surface of the article during the rust proofing treatment.

In carrying out the improved process, the solution is first heated to boiling and the plates placed therein. Then while the heating is continued, the frame 3 is slowly moved up and down until the coating has progressed to a suitable degree. The plates are then removed and dried.

Having now described the invention and the preferred form of embodiment thereof it is to be understood that the said invention is not to be limited to the specific details herein described and shown but only by the scope of the claims which follow.

I claim:

1. The process which consists in treating iron or steel articles with a rust proofing solution adapted to form an iron compound upon the surface of said articles and at the same time subjecting said articles to a treatment to prevent crystal growth upon the said surfaces.

2. The process which consists in treating iron or steel articles with a rust proofing solution adapted to form an iron phosphate upon the surface of said articles and at the same time subjecting said articles to a treatment to prevent crystal growth upon the said surfaces.

3. The process which consists in treating iron or steel articles with a rust proofing solution adapted to form an iron compound upon the surface of said articles and at the same time rubbing lightly the surfaces of the articles with pads of material inert to the solution and coating.

4. The process which consists in treating iron or steel articles with a rust proofing solution adapted to form an iron compound upon the surface of said articles and at the same time disturbing the comparatively quiescent layer of solution adjacent said surfaces by moving in contact with said surfaces bodies of inert solid material.

5. The process which consists in treating iron or steel articles with a rust proofing solution adapted to form an iron phosphate upon the surface of said articles and at the same time disturbing the comparatively quiescent layer of solution adjacent said surfaces by moving in contact with said surfaces bodies of inert solid material.

WILLIAM H. ALLEN.